United States Patent
Iwaki (10) Patent No.: US 7,248,303 B2
(45) Date of Patent: Jul. 24, 2007

(54) INFORMATION PROCESSING APPARATUS CAPABLE OF DISPLAYING MOVING IMAGE DATA IN FULL SCREEN MODE AND DISPLAY CONTROL METHOD

(75) Inventor: Tsutomu Iwaki, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 29 days.

(21) Appl. No.: 11/185,818

(22) Filed: Jul. 21, 2005

(65) Prior Publication Data

US 2006/0017844 A1 Jan. 26, 2006

(30) Foreign Application Priority Data

Jul. 21, 2004 (JP) ............. P2004-213320

(51) Int. Cl.
  *H04N 5/46* (2006.01)
  *H04N 9/74* (2006.01)
(52) U.S. Cl. .................. 348/558; 348/581
(58) Field of Classification Search ........ 348/554–556, 348/558, 581; 345/698, 699, 625
  See application file for complete search history.

(56) References Cited

U.S. PATENT DOCUMENTS

| | | | |
|---|---|---|---|
| 4,949,180 A * | 8/1990 | Miles | 348/593 |
| 5,943,064 A | 8/1999 | Hong | |
| 6,738,072 B1 | 5/2004 | MacInnis et al. | |
| 7,106,383 B2 * | 9/2006 | Kahn | 348/556 |
| 2002/0122046 A1 | 9/2002 | Dischert et al. | |
| 2002/0145610 A1 | 10/2002 | Barilovits et al. | |
| 2003/0038823 A1 | 2/2003 | Pasqualini et al. | |
| 2004/0252238 A1 * | 12/2004 | Park et al. | 348/556 |
| 2005/0157948 A1 * | 7/2005 | Lee | 382/299 |

FOREIGN PATENT DOCUMENTS

| | | |
|---|---|---|
| EP | 0 653 742 A2 | 5/1995 |
| JP | 2002-108486 | 4/2002 |

OTHER PUBLICATIONS

European Search Report issued by the European Patent Office, dated May 12, 2006, for European Patent Application No. 05106663.7.

* cited by examiner

Primary Examiner—Ngoc-Yen Vu
Assistant Examiner—Scott Egan
(74) Attorney, Agent, or Firm—Finnegan, Henderson, Farabow, Garrett & Dunner, L.L.P.

(57) ABSTRACT

An information processing apparatus including: a display that is capable of displaying moving image data in a full screen mode; a first signal processing section that generates a signal for forming the moving image data to be displayed on the display; a second signal processing section that executes image quality processing for the signal generated by the first signal processing section; a determination section that determines whether or not a display mode to display the moving image data is the full screen mode based on a relationship between a screen size of the moving image data and a screen size of the display; and a control section that enables the signal subjected to the image quality processing by the second signal processing section to be output to the display when the determination section determines that the display mode to display the moving image data is the full screen mode.

14 Claims, 5 Drawing Sheets

INFORMATION PROCESSING APPARATUS CAPABLE OF DISPLAYING MOVING IMAGE DATA IN FULL SCREEN MODE AND DISPLAY CONTROL METHOD

CROSS-REFERENCE TO RELATED APPLICATIONS

This application is based upon and claims the benefit of priority from the prior Japanese Patent Application No. 2004-213320, filed on Jul. 21, 2004; the entire contents of which are incorporated herein by reference.

BACKGROUND OF THE INVENTION

1. Field of the Invention

This invention relates to an information processing apparatus that can display moving image data on a display and a display control method-used with the apparatus.

2. Description of the Related Art

In recent years, a personal computer including an AV reproduction function like that of an audio video (AV) machine such as a DVD (Digital Versatile Disk) player or a TV has been developed.

For example, JP-A-2002-108486 discloses a personal computer installing a DVD drive and a TV tuner. In the computer in JP-A-2002-108486, a video signal obtained from the TV tuner is processed by an image controller and then is displayed on a display section directly connected to the image controller.

BRIEF SUMMARY OF THE INVENTION

By the way, to display moving image data provided by the DVD drive and the TV tuner with sufficiently high image quality, a function of executing video signal processing to put the moving image into high image quality becomes necessary. However, the personal computer disclosed in JP-A-2002-108486 is not provided with such a video signal processing function for the moving image.

The video signal processing for the moving image is mainly used for image enhancement. Thus, if the video signal processing for the moving image is applied to a still image of text, graphics, etc., the viewability of the still image may be degraded.

The present invention provides an information processing apparatus and a display control method capable of displaying a moving image with high image quality.

DETAILED DESCRIPTION OF THE INVENTION

Referring now to the accompanying drawings, an embodiment of the invention will be described.

To begin with, the configuration of an information processing apparatus according to one embodiment of the invention will be discussed with reference to FIGS. 1 and 2. The information processing apparatus is implemented as a notebook personal computer 10, for example.

Figure 1:
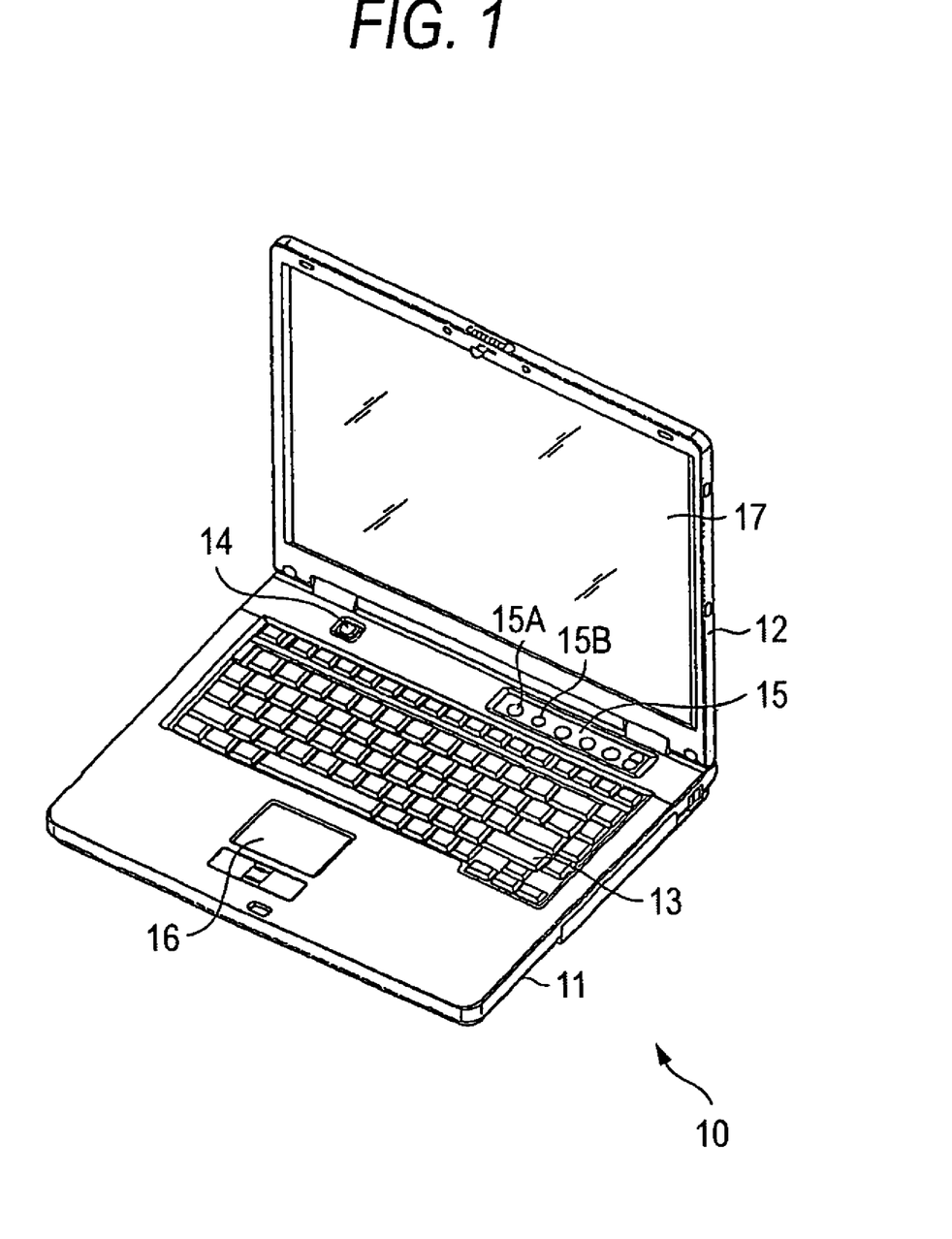
FIG. 1 is a perspective view showing the appearance of a computer according to one embodiment of the invention.

FIG. 1 is a front view of the notebook personal computer 10 with a display unit thereof open. The computer 10 has a computer main unit 11 and a display unit 12. A display implemented as an LCD (Liquid Crystal Display) 17 is built in the display unit 12, and a display screen of the LCD 17 is positioned almost in the center of the display unit 12.

The display unit 12 is attached to the computer main unit 11 for rotation between an open position and a closed position of the computer. The computer main unit 11 has a thin box-shaped cabinet on which a keyboard 13, a power button 14 for turning on/off power of the computer 10, an input operation panel 15, a touch pad 16, and the like are placed.

The input operation panel 15 is an input unit for inputting an event corresponding to the pressed button and includes a plurality of buttons for starting a plurality of functions. The buttons contain a TV start button 15A and a DVD/CD start button 15B. The TV start button 15A is a button for reproducing TV broadcast program data. When the user presses the TV start button 15A, an application program for reproducing TV broadcast program data is started automatically. The DVD/CD start button 15B is a button for reproducing video content recorded on a DVD or a CD. When the user presses the DVD/CD start button 15B, an application program for reproducing video content is started automatically.

To display moving image data such as TV broadcast program data or video content on the LCD 17 with high image quality, the computer 10 of the embodiment is provided with a function of automatically putting the moving image data into high image quality when the moving image data is reproduced.

Next, the system configuration of the computer 10 will be discussed with reference to FIG. 2.

Figure 2:
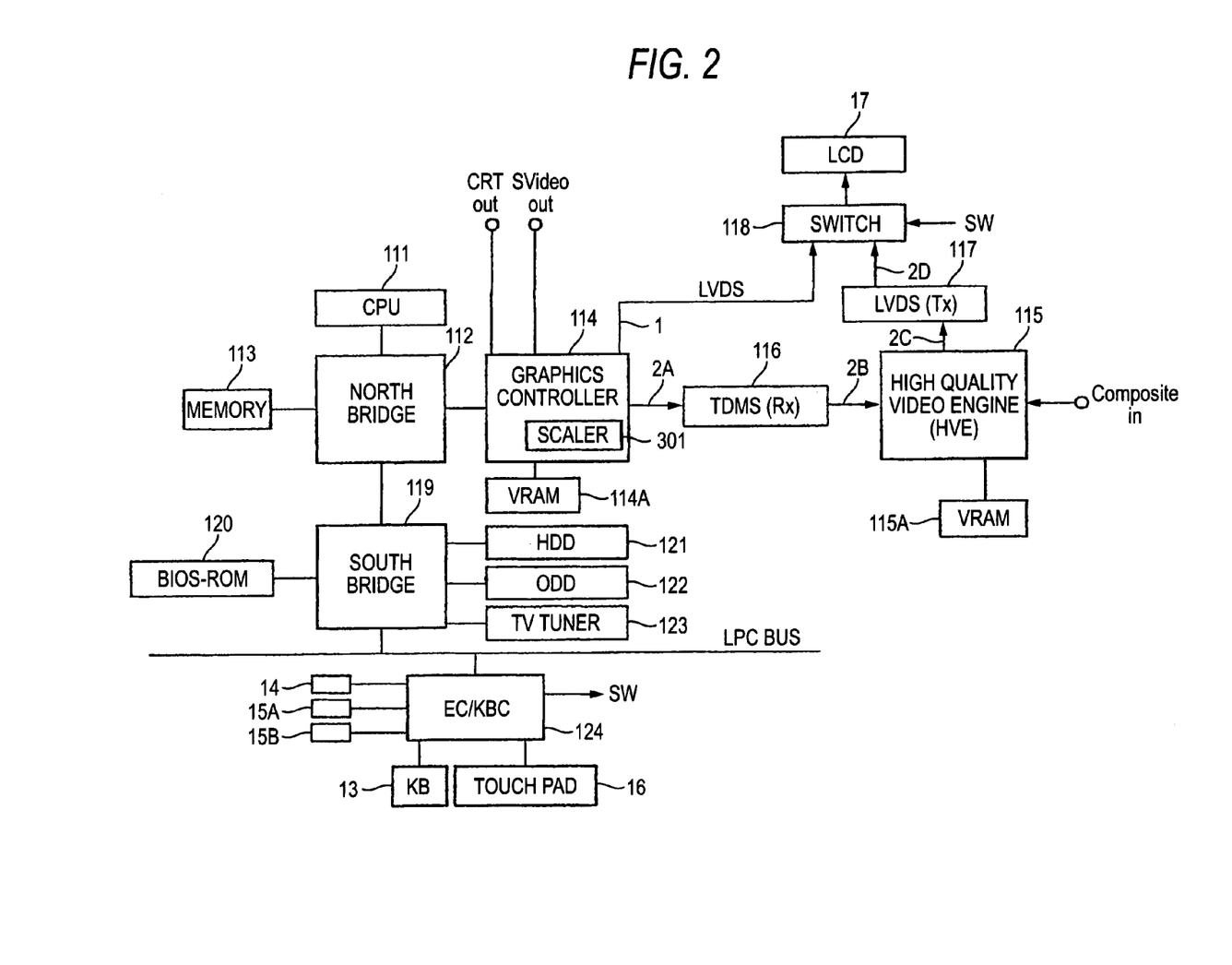
FIG. 2 is a block diagram showing the system configuration of the computer in FIG. 1.
Figure 3:
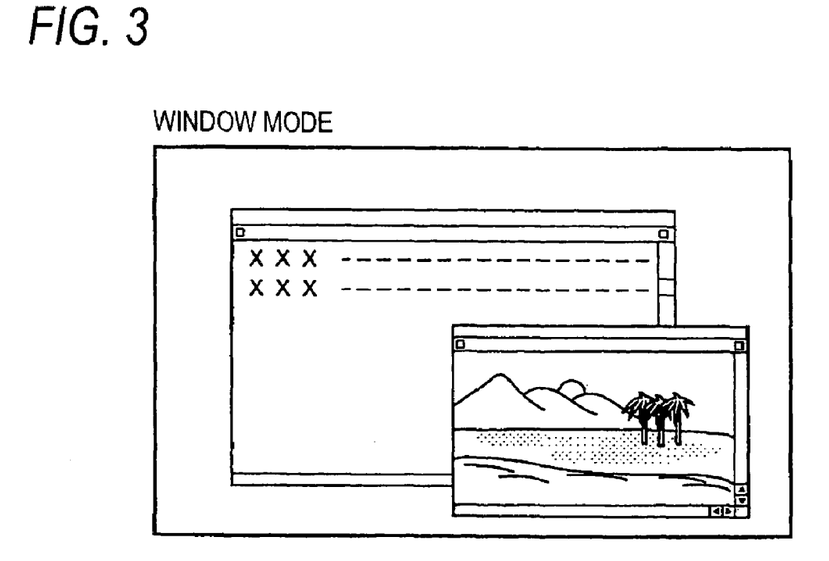
FIG. 3 is a drawing showing how moving image data is displayed in a window mode in the computer in FIG. 1.

As shown in FIG. 2, the computer 10 includes a CPU 111, a north bride 112, main memory 113, a graphics controller 114, a high quality video engine (HVE) 115, a TMDS (Rx) processing section 116, an LVDS (Tx) processing section 117, a switch 118, a south bridge 119, a BIOS-ROM 120, a hard disk drive (HDD) 121, an optical disk drive (ODD) 122, a TV tuner 123, an embedded controller/keyboard controller IC (EC/KBC) 124, and the like.

The CPU 111 is a processor provided for controlling the operation of the computer 10 and executes the operating system (OS) and various application programs loaded into the main memory 113 from the hard disk drive (HDD) 121. The OS has a window system for displaying a plurality of windows on a display screen.

Figure 4:
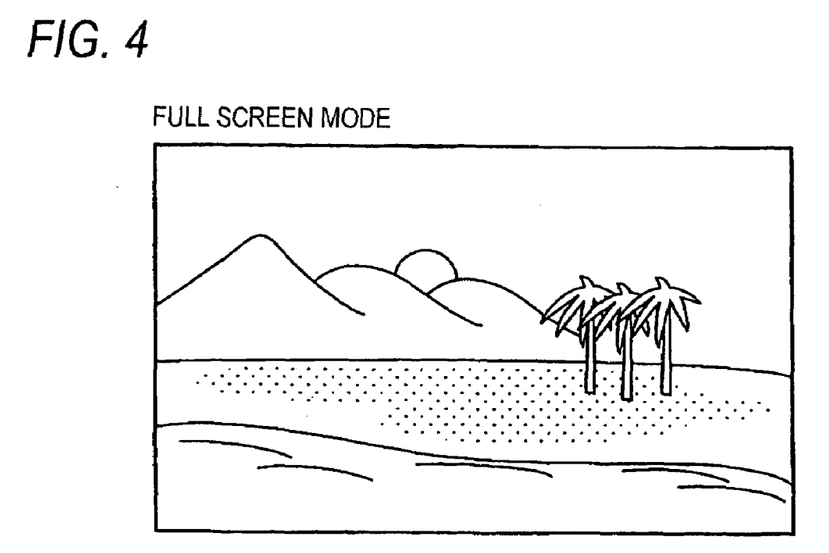
FIG. 4 is a drawing showing how the moving image data is displayed in a full screen mode in the computer in FIG.

The moving image data (for example, TV broadcast program data received by the TV tuner 123, video content recorded on a storage medium such as a DVD or an HDD, etc.,) is displayed in a window corresponding to a video reproduction application program for reproducing the moving image data. In this case, for example, the window corresponding to the video reproduction application program is placed on a desktop screen and the moving image data is displayed in the window (window mode). The computer 10 can also display the moving image data on the display screen of the LCD 17 in a full screen mode. In the full screen mode, only the moving image data is displayed in almost all area on the display screen, as shown in FIG. 4. In this case, basically the desktop screen and the window corresponding to any application program other than the video reproduction application program are not displayed. A menu bar, etc., of the window corresponding to the video reproduction application program is not displayed either and the moving image data is displayed in almost all area on the display screen.

The CPU 111 also executes system BIOS (Basic Input Output System) stored in the BIOS-ROM 120. The system BIOS is a program for controlling hardware.

The north bride 112 is a bridge device for connecting a local bus of the CPU 111 and the south bridge 119. The north bride 112 contains a memory controller for controlling access to the main memory 113. The north bride 112 also has a function of executing communications with the graphics controller 114 via an AGP (Accelerated Graphics Port) bus, etc.

The graphics controller 114 is a display controller for controlling the LCD 17 used as a display monitor of the computer 10. The graphics controller 114 has video memory (VRAM) 114A and generates a video signal for forming a display image to be displayed on the LCD 17 from display data written into the video memory (VRAM) 114A by OS/application program. The display image to be displayed on the LCD 17 usually is made up of the image of the desktop screen and the image of each window placed on the desktop screen. However, to display the moving image data in the full screen mode, the display image displayed on the LCD 17 is implemented as the image of the moving image data. Therefore, to display the moving image data in the full screen mode, the video signal for forming the display image of the moving image data is output from the graphics controller 114.

The graphics controller 114 further includes a scaler 301. The scaler 301 executes scaling processing to change the screen size (resolution) and the aspect ratio of the moving image data drawn using the video memory (VRAM) 114A in response to a scaling request from the video reproduction application program, for example. To display the moving image data in the full screen mode, the video reproduction application program draws moving image data of the screen size (resolution) almost equal to the screen size (resolution) of the LCD 17 in the video memory (VRAM) 114A through a display driver, or issues a scaling request for scaling up the screen size (resolution) of the moving image data drawn in the video memory (VRAM) 114A to the display driver.

The video signal generated by the graphics controller 114 is output to a line 1 and a line 2A. The video signal output to the line 1 is implemented as an 18-bit signal in LVDS (Low Voltage Differential Signaling) format, for example. The video signal output to the line 2A is implemented as a 24-bit signal in TMDS (Transition Minimized Differential Signaling) format, for example. The graphics controller 114 also has an interface for outputting an analog video signal to an external CRT (Cathode Ray Tube) and an interface for outputting an analog video signal through an s-video terminal to an external machine.

The TMDS (Rx) processing section 116 converts the 24-bit signal in the TMDS format sent from the graphics controller 114 via the line 2A into a 24-bit RGB digital signal and sends the 24-bit RGE digital signal to the high quality video engine (HVE) 115 via a line 2B.

The high quality video engine (HVE) 115 is a video processing controller for executing video processing to put the video signal generated by the graphics controller 114 into high image quality, which will be hereinafter referred to as image quality correction processing or image quality processing. The high quality video engine (HVE) 115 has video memory (VRAM) 115A. The image quality correction processing is executed in the video memory (VRAM) 115A. The image quality correction processing is video processing dedicated to a moving image to put a moving image into high image quality and is executed to display a smooth high-quality moving image on the LCD 17. In the image quality correction processing, to improve the image quality of a moving image, for example, color correction (gamma correction, white balance adjustment, brightness adjustment, contrast adjustment), sharpness adjustment, edge enhancement, and processing to improve the response speed of the LCD, etc., are performed.

The high quality video engine (HVE) 115 can also perform the image quality correction processing for a video signal input from an external video machine through a composite input terminal.

The video signal subjected to the image quality correction by the high quality video engine (UVE) 115 is sent via a line 2C to the LVDS (Tx) processing section 117. The LVDS (Tx) processing section 117 converts the RGB digital signal subjected to the image quality correction output from the high quality video engine (HVE) 115 into a signal in LVDS (Low Voltage Differential Signaling) format and outputs the signal in the LVDS format to a line 2D.

The switch 118 functions as a selector for selectively outputting one of a video signal generated by the graphics controller 114 and a video signal subjected to image quality correction by the high quality video engine (HVE) 115 to the LCD 17. The switch 118 has a first input terminal connected to the line 1, a second input terminal connected to the line 2D, and an output terminal connected to the LCD 17. The switch 118 selects one of the first input terminal and the second input terminal in response to a switch control signal SW supplied from the EC/KBC 124 and connects the selected input terminal to the output terminal, In the embodiment, the switch 118 makes it possible to use the following two display control modes:

(1) Normal mode: In the normal mode, the video signal from the graphics controller 114 is sent to the LCD 17 not via the high quality video engine (HVE) 115.

(2) High image quality mode: In the high image quality mode, the video signal from the graphics controller 114 is sent to the LCD 17 via the high quality video engine (HVE) 115. The high image quality mode is used to display moving image data in the full screen mode, for example. The reason is that if the image quality correction processing for the moving image is performed for a still image (desktop screen, operation screen of wordprocessing software, operation screen of spreadsheet software, etc.), sharpness is too enhanced and the viewability of the still image may be degraded.

In switching from the normal mode to the high image quality mode, the switch 118 stops output of the video signal generated by the graphics controller 114 to the LCD 17 and then outputs the video signal subjected to the image quality processing by the high quality video engine (MVE) 115 to the LCD 17.

The south bridge 119 controls devices on an LPC (Low Pin Count) bus. The south bridge 119 contains an IDE (Integrated Drive Electronics) controller for controlling the HDD 121 and the ODD 122. Further, the south bridge 119 also has a function to control the TV tuner 123 and a function to control access to the BIOS-ROM 120.

The optical disk drive (ODD) 122 is a drive unit for driving a storage medium such as a DVD or a CD storing video content. The TV tuner 123 is a receiver for receiving broadcast program data of a TV broadcast program, etc.

The embedded controller/keyboard controller IC (EC/KBC) 124 is a one-chip microcomputer into which an embedded controller for power management and a keyboard controller for controlling the keyboard (KB) 13 and the touch pad 16 are integrated. The embedded controller/keyboard controller IC (EC/KBC) 124 has a function of turning on/off the power of the computer 10 in response to user's operation of the power button 14.

Further, the embedded controller/keyboard controller IC (EC/KBC) 124 has a function of supplying the above-mentioned switch control signal SW to the switch 118.

Figure 5:
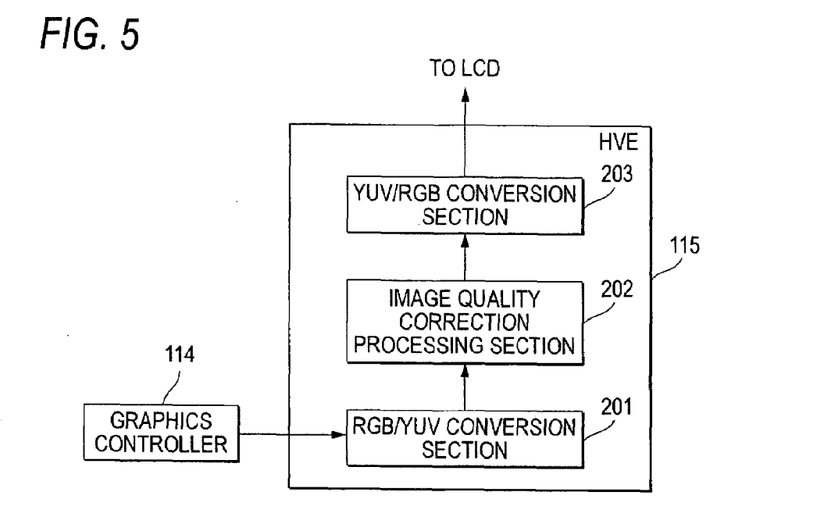
FIG. 5 is a block diagram showing the configuration of a high quality video engine installed in the computer in FIG. 1.

Next, a configuration example of the high quality video engine (HVE) 115 will be discussed with reference to FIG. 5.

As shown in the figure, the high quality video engine (HVE) 115 includes an RGS/YUV conversion section 201, an image quality correction processing section 202, a YUV/RGB conversion section 203, and the like.

The RGB/YUV conversion section 201 converts a video signal transmitted from the graphics controller 114 through the TMDS (Rx) processing section 116 from the 24-bit RGB signal into a 24-bit YUV signal. The image quality correction processing section 202 performs operation processing on the YUV signal for image quality correction (color correction (gamma correction, white balance adjustment, brightness adjustment, contrast adjustment), sharpness adjustment, edge enhancement, and response speed improvement). The YUV/RGB conversion section 203 converts the video signal subjected to the image quality correction processing from the 24-bit YUV signal into an 18-bit RGB signal. This RGB signal is sent to via the line 2C to the LVDS (Tx) processing section 117.

Figure 6:
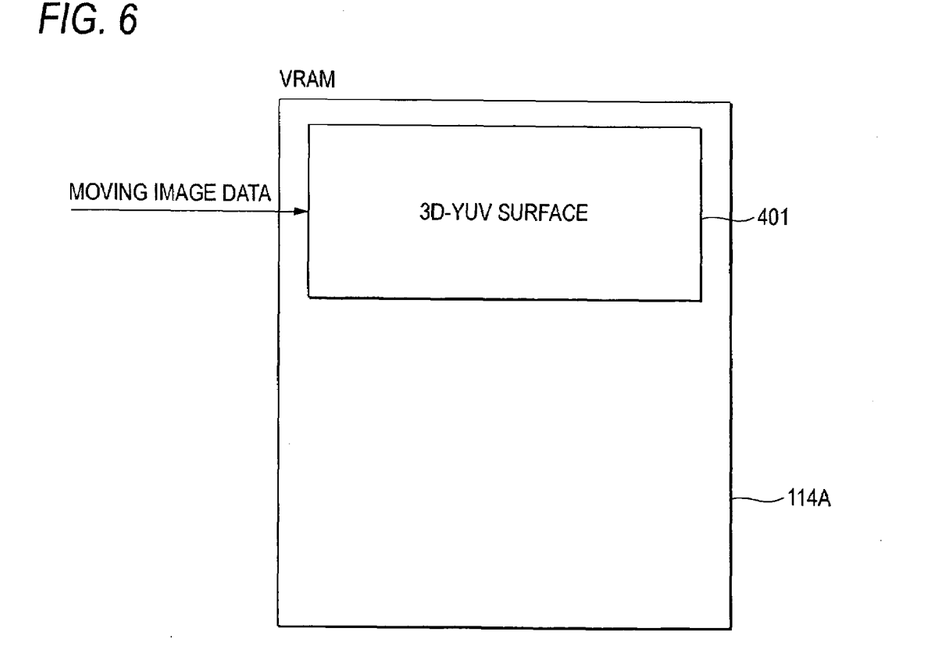
FIG. 6 is a drawing showing an example of a surface used to draw moving image data, generated in the computer in FIG. 1.

FIG. 6 shows an example of a surface 401 generated in the video memory (VRAM) 114A by the display driver. The surface 401 is a storage area in the video memory (VRAM) 114A used to draw (render) moving image data, etc., and is called 3D (three-dimensional)-YUV surface. The video reproduction application program requests the display driver to generate the 3D-YUV surface 401 and draws moving image data in the 3D-YUV surface 401 generated by the display driver. The moving image data is drawn in the YIN format.

The display driver executes the following processing to detect whether or not the display mode to display moving image data is the full screen mode:

The display driver detects the screen size of the moving image data drawn in the video memory (VRAM) 114A (in units of the vertical and horizontal numbers of dots) from the screen size of the 3D-YUV surface 401 specified in the surface generation request from the video reproduction application program. The display driver detects whether or not the display mode to display the moving image data is the full screen mode based on the relationship between the screen size of the moving image data and the screen size of the LCD 17.

When the screen size of the moving image data matches the screen size of the LCD 17, the display driver detects that the display mode to display the moving image data is the full screen mode. In the full screen mode, the video signal for forming the display image of the moving image is output from the graphics controller 114. In this case, the display driver automatically executes processing for switching the display control mode from the normal mode to the high image quality mode to send the video signal from the graphics controller 114 via the high quality video engine 115 to the LCD 17.

Thus, in the embodiment, when the moving image data is displayed in the full screen mode, the display control mode is automatically switched from the normal mode to the high image quality mode. Thus, the image quality of the moving image data can be improved.

As described above, whether or not the display mode to display the moving image data is the full screen mode is detected based on the relationship between the screen size of the moving image data and the screen size of the LCD 17. Thus, whether or not the display mode to display the moving image data is the full screen mode can be detected correctly regardless of the type of application program for reproducing the moving image data. That is, some application programs display moving image data in the full screen mode only by conducting communications with the operating system without notifying the display driver that the full screen mode is entered. In the embodiment, even when the display driver is not notified that the full screen mode is entered, the display driver can detect whether or not the display mode to display the moving image data is the full screen mode. Therefore, the moving image data can be displayed with high image quality in the full screen mode regardless of the type of application program for reproducing the moving image data.

Figure 7:
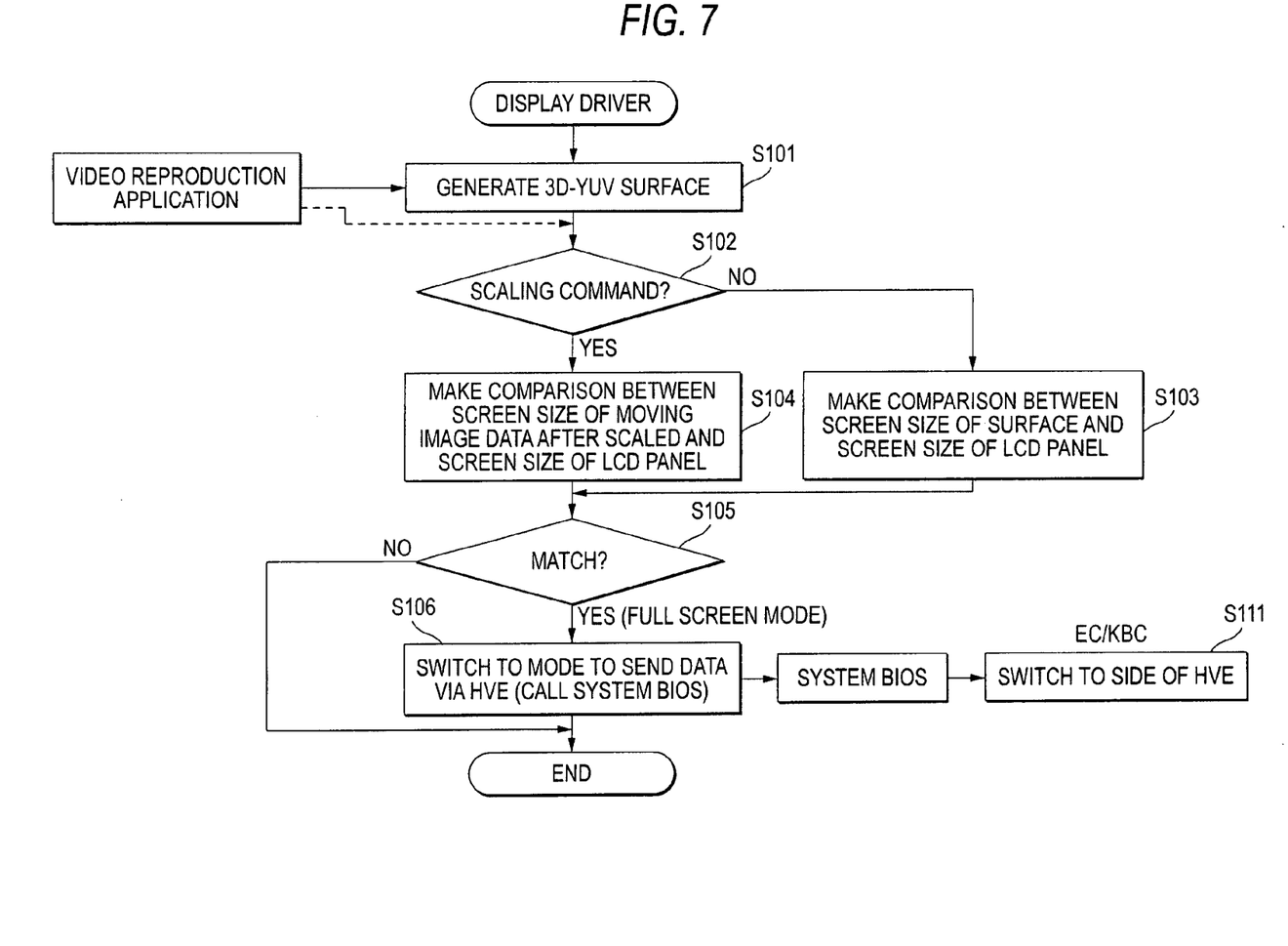
FIG. 7 is a flowchart showing a procedure of display control processing executed in the computer in FIG. 1.

Next, display control processing executed by the computer 10 will be discussed with reference to a flowchart of FIG. 7.

The video reproduction application program issues a surface generation request (surface request command) to the display driver. The surface request command also contains information specifying the screen size of the 3D-YUV surface to be generated. The display driver generates the 3D-YUV surface having the screen size specified in the surface request command in the video memory (VRAM) 114A in response to the surface request command (step S101). Then, the display driver determines whether or not a scaling command is issued from the video reproduction application program to the graphics controller 114 (step S102).

When a scaling command is not issued, the display driver makes a comparison between the screen size of the generated 3D-YUV surface and the screen size of the LCD 17 (step S103) and determines whether or not the screen size of the generated 3D-YUV surface matches the screen size of the LCD 17 (step S105). The screen size of the LCD 17 is not the physical size of the. LCD 17 and is the screen size (resolution) corresponding to the current display mode that can be set by the user, for example. When the screen size of the generated 3D-YUV surface matches the screen size of the LCD 17 (YES step S105), the display driver determines that the current display mode of the moving image data is the full screen mode, and switches the display control mode to send the video signal from the graphics controller 114 to the LCD 17 to the mode to send the Video signal via the high quality video engine (HVE) 115 to the LCD 17 (high image quality mode) (step S106).

At step S106, the display driver calls the system BIOS and notifies the system BIOS that a switching event to the high image quality mode has occurred. The system BIOS executes processing of switching the switch 118 to the side of the high quality video engine (HVE) 115 through the EC/KBC 124 (step S111).

On the other hand, when a scaling command is issued, the display driver makes a comparison between the screen size of the moving image data after scaled by the scaler 301 (the screen size of the 3D-YUV surface after scaled) and the screen size of the LCD 17 based on the parameter specified in the scaling command (enlargement ratio or the size of the screen to be displayed) (step S104). The display driver determines whether or not the screen size of the moving image data after scaled matches the screen size of the LCD 17 (step S105). The screen size of the LCD 17 is not the physical size of the LCD 17 and is the screen size (resolution) corresponding to the current display mode, as described above. When the screen size of the moving image data after scaled matches the screen size of the LCD 17 (YES step S105), the display driver determines that the current display mode of the moving image data is the full screen mode, and switches the display control mode to send the video signal from the graphics controller 114 to the LCD 17 to the mode to send the video signal via the high quality video engine (HVE) 115 to the LCD 17 (high image quality mode) (step S106).

When the aspect ratio of the moving image data drawn by the application program differs from the aspect ratio of the LCD 17, a slight difference may occur between the screen size of the moving image data and the screen size of the LCD 17 even in the full screen mode. Thus, the mode may be determined the full screen mode provided that the screen size of the moving image data almost equal to the screen size of the LCD 17.

In the description of the embodiment, the scaler of the graphics controller 114 is used to perform scaling processing of the image drawn on the surface in the VRAM 114A. However, a scaler installed in the high quality video engine (HVE) 115 may be used to perform scaling processing of the image in the VRAM 115A.

The graphics controller 114 and the high quality video engine (HVE) 115 can also be implemented in one LSI. In this case, the graphics controller 114 and the high quality video engine (HVE) 115 function as two signal processing sections in the LSI.

It is to be understood that the invention is not limited to the specific embodiment described above and that the invention can be embodied with the components modified without departing from the spirit and scope of the invention. The invention can be embodied in various forms according to appropriate combinations of the components disclosed in the embodiment described above. For example, some components may be deleted from all components shown in the embodiment. Further, the components in different embodiments may be used appropriately in combination.

What is claimed is:

1. An information processing apparatus comprising:
    a display that is capable of displaying moving image data in one of a full screen mode and a window mode;
    a first signal processing section that generates a signal for forming the moving image data to be displayed on the display;
    a second signal processing section that executes image quality processing for the signal generated by the first signal processing section;
    a determination section that determines whether or not a display mode to display the moving image data is the full screen mode based on a relationship between a screen size of the moving image data and a screen size of the display; and
    a control section that enables the signal subjected to the image quality processing by the second signal processing section to be output to the display when the determination section determines that the display mode to display the moving image data is the full screen mode.

2. The information processing apparatus as claimed in claim 1, wherein when the determination section determines that the display mode to display the moving image data is the full screen mode, the control section stops outputting the signal for forming the moving image data generated by the first signal processing section to the display, and then outputs the signal subjected to the image quality processing by the second signal processing section to the display.

3. The information processing apparatus as claimed in claim 1, further comprising
    memory for securing a surface, which has a screen size specified from a program or reproducing the moving image data, where the moving image data is drawn;
    wherein the determination section makes a comparison between a screen size of the surface secured in the memory and the screen size of the display.

4. The information processing apparatus as claimed in claim 1, further comprising
    memory for securing a surface, which has a screen size specified from a program for reproducing the moving image data, where the moving image data is drawn;
    wherein the first signal processing section changes the screen size of the moving image data drawn on the surface; and
    the determination section makes a comparison between the screen size of the moving image data thus changed by the first signal processing section and the screen size of the display.

5. The information processing apparatus as claimed in claim 1, further comprising
    a receiver that receives broadcast program data;
    wherein the moving image data is the broadcast program data received by the receiver.

6. The information processing apparatus as claimed in claim 1, further comprising
    a drive unit that drives a storage medium;
    wherein the moving image data is data reproduced from the storage medium by the drive unit.

7. An information processing apparatus comprising:
    a display that is capable of displaying moving image data in one of a full screen mode and a window mode;
    a first signal processing section that generates a signal for forming the moving image data to be displayed on the display;
    a second signal processing section that executes image quality processing for the signal generated by the first signal processing section;
    a determination section that determines whether or not a display mode to display the moving image data is the full screen mode based on a relationship between a screen size of the moving image data and a screen size of the display; and
    a control section that switches from a first mode to send the signal generated by the first signal processing section to the display not via the second signal processing section to a second mode to send the signal generated by the first signal processing section to the display via the second signal processing section when the determination means determines that the display mode to display the moving image data is the full screen mode.

8. The information processing apparatus as claimed in claim 7, further comprising a selector that selectively outputs one of the signal output from the first signal processing section and the signal subjected to the image quality processing by the second signal processing section to the display;
wherein the control section controls the selector to switch between the first mode and the second mode.

9. A display control method for displaying moving image data on a display of an information processing apparatus, which includes a first signal processing section that generates a signal for forming the moving image data to be displayed on the display and a second signal processing section that executes image quality processing for the signal generated by the first signal processing section, the display control method comprising:
determining whether or not a display mode to display the moving image data is a full screen mode based on a relationship between a screen size of the moving image data and a screen size of the display; and
controlling to output the signal subjected to the image quality processing by the second signal processing section to the display when it is determined during determining that the display mode to display the moving image data is the full screen mode.

10. The display control method as claimed in claim 9, wherein when it is determined during the determining that the display mode to display the moving image data is the full screen mode, during the controlling, stopping to output the signal for forming the moving image data generated by the first signal processing section to the display and then outputting the signal subjected to the image quality processing by the second signal processing section to the display.

11. The display control method as claimed in claim 9, wherein
the information processing apparatus further comprises memory for securing a surface, which has a screen size specified from a program for reproducing the moving image data, where the moving image data is drawn; and
during the determining, making a comparison between the screen size of the surface secured in the memory and the screen size of the display.

12. The display control method as claimed in claim 9, wherein
the information processing apparatus further comprises memory for securing a surface, which has a screen size specified from a program for reproducing the moving image data, where the moving image data is drawn, wherein the first signal processing section changes the screen size of the moving image data drawn on the surface; and
during the determining, making a comparison between the screen size of the moving image data thus changed by the first signal processing section and the screen size of the display.

13. The display control method as claimed in claim 9, wherein
the information processing apparatus further comprises a receiver that receives broadcast program data; and
the moving image data is the broadcast program data received by the receiver.

14. The display control method as claimed in claim 9, wherein
the information processing apparatus further comprises a drive unit that drives a storage medium; and
the moving image data is data reproduced from the storage medium by the drive unit.

* * * * *